(12) United States Patent
Jones

(10) Patent No.: US 6,360,280 B1
(45) Date of Patent: *Mar. 19, 2002

(54) METHOD AND SYSTEM FOR ACCESSING SHELL FOLDER CAPABILITIES BY AN APPLICATION PROGRAM

(75) Inventor: Gregory A. Jones, Seattle, WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/920,572

(22) Filed: Aug. 29, 1997

Related U.S. Application Data

(63) Continuation of application No. 08/356,081, filed on Dec. 13, 1994, now abandoned.

(51) Int. Cl.[7] ............................................. G06F 9/54
(52) U.S. Cl. ................................... 709/328; 345/781
(58) Field of Search ................. 395/682; 707/200–206; 709/310–332; 345/781–807

(56) References Cited

U.S. PATENT DOCUMENTS

| | | | | |
|---|---|---|---|---|
| 5,206,951 A | * | 4/1993 | Khoyi et al. | 709/315 |
| 5,226,161 A | * | 7/1993 | Khoyi et al. | 709/316 |
| 5,261,080 A | * | 11/1993 | Khoyi t al. | 710/65 |
| 5,303,379 A | * | 4/1994 | Khoyi et al. | 717/10 |
| 5,307,086 A | * | 4/1994 | Griffin et al. | 345/808 |
| 5,355,497 A | * | 10/1994 | Cohen-Levy | 707/200 |
| 5,369,778 A | * | 11/1994 | San Soucie et al. | 707/103 |
| 5,371,675 A | * | 12/1994 | Greif et al. | 707/503 |
| 5,412,774 A | * | 5/1995 | Agraawal et al. | 345/804 |
| 5,412,776 A | * | 5/1995 | Bloomfield et al. | 345/783 |
| 5,421,012 A | * | 5/1995 | Khoyi et al. | 709/107 |
| 5,421,015 A | * | 5/1995 | Khoyi et al. | 709/107 |
| 5,488,721 A | * | 1/1996 | Rich et al. | 707/103 R |

OTHER PUBLICATIONS

Microsoft Corporation, *Microsoft Windows Version 3.1 User's Guide for the Microsoft Windows Operating System*, Chapter 4, "File Manager," pp. 91, 118–133.
WordPerfect Corporation, *WordPerfect for Windows for Computers Running Windows Workbook 3.0 or Higher*, Lesson 10, "File Manager," pp. 99–112.
Simpson, Alan, "Mastering WordPerfect® 5.1 & 5.2 for Windows", SYBEX®, pp. 415–447, 1993.*
Harmon, Trevor, "Extending the Windows File Manager," C/C++ Users Journal, pp. (12), Sep. 1994.*

* cited by examiner

Primary Examiner—St. John Courtenay, III
(74) Attorney, Agent, or Firm—Banner & Witcoff, Ltd.

(57) ABSTRACT

A method, a computer system and a computer-readable medium are provided for providing a single window in which a user may both modify a file system hierarchy of the computer system and select a file system object name to use for saving an application document residing in a memory of the computer system as a file system object. A window containing a visual representation of the file system hierarchy is displayed. A command to modify the file system hierarchy is received in connection with the window. The received command to modify the file system hierarchy is processed. The visual representation of the file system hierarchy is redisplayed in the window to reflect the modification of the file system hierarchy. A command to select a file system object name within the file system hierarchy is received in connection with the window. A representation of the application document residing in the memory is stored as a file system object using the selected file system object name.

37 Claims, 12 Drawing Sheets

METHOD AND SYSTEM FOR ACCESSING SHELL FOLDER CAPABILITIES BY AN APPLICATION PROGRAM

CROSS-REFERENCE TO RELATED APPLICATION

This application is a file-wrapper continuation of U.S. patent application Ser. No. 08/356,081, filed Dec. 13, 1994, abandoned.

TECHNICAL FIELD

This invention relates generally to a method and system for managing folders and, in particular, to a method and system in which an application program can access the folder management capabilities of a shell program.

BACKGROUND OF THE INVENTION

Computer systems have operating systems that have functions through which an application program can interact with files maintained by the operating system. These functions include opening, moving, copying, deleting, or renaming a file. These functions can also include creating and naming directories (also known as "folders") or subdirectories in which to store files.

Typical computer systems include a shell, which is a program that provides direct communications between a user and the operating system. For example, a shell may provide the capability to list, delete, and copy files, to start the execution of other programs, to configure resources, etc. The shell may be implemented as a single computer program or as several computer programs. For example, a shell may include a file manager program that allows a user to manage the files stored by a file system portion of the operating system. Such a file manager program can move a file from one folder to another, copy a file, delete a file, rename a file, change various properties associated with the file, and launch an application program associated with a file. A file manager program can also create new folders. File manager programs typically provide comprehensive functionality for managing files and folders.

Application programs often provide capabilities to manage files, but such capabilities are often limited. For example, typical word processing programs can only open files and save files which are the capabilities needed to support word processing. Thus, a user wishing to manipulate a file using a function other than opening or saving needs to switch from the word processing program to the file manager program to manipulate the file. For example, when a user enters new data using a word processing program; the user often wishes to save that new data in a new file stored in a new folder. In order to do this, the user enters the new data using the word processing program, switches from the word processing program to the file manager program to create the new folder, and then switches back to the word processing program to save the new data in a new file in the newly created folder.

Some application programs include additional file manipulation functions that include moving, renaming, and deleting files. However, each developer of an application program that wants to include additional file manipulation functions needs to develop the user interface and computer code to support such functions. This development increases the burden on the application developer and creates a lack of consistency of the user interface for managing files between the operating system and the application programs.

Additionally, even if an application developer modeled the user interface after that provided by the file manager program, if the user interface of the file manager program was later changed, there would then be a lack of consistency.

The present invention is described below using some object-oriented techniques; thus, an overview of well-known object-oriented programming techniques is provided. Two common characteristics of object-oriented programming languages are support for data encapsulation and data type inheritance. Data encapsulation refers to the binding of functions and data. Inheritance refers to the ability to declare a data type in terms of other data types. In the C++ language, data encapsulation and inheritance are supported through the use of classes. A class is a user-defined type. A class declaration describes the data members and function members of the class. A function member is also referred to as a method of a class. The data members and function members of a class are bound together in that the function operates on an instance of the class. An instance of a class is also called an object of the class. Thus, a class provides a definition for a group of objects with similar properties and common behavior.

To allocate storage for an object of a particular type (class), an object is instantiated. Once instantiated, data can be assigned to the data members of the particular object. Also, once instantiated, the function members of the particular object can be invoked to access and manipulate the data members. Thus, in this manner, the function members implement the behavior of the object, and the object provides a structure for encapsulating data and behavior into a single entity.

To support the concept of inheritance, classes may be derived from (based upon the declaration of) other classes. A derived class is a class that inherits the characteristics—data members and function members—of its base classes. A class that inherits the characteristics of another class is a derived class. A class that does not inherit the characteristics of another class is a primary (root) class. A class whose characteristics are inherited by another class is a base class. A derived class may inherit the characteristics of several classes; that is, a derived class may have several base classes. This is referred to as multiple inheritance.

A class may also specify whether its function members are virtual. Declaring that a function member is virtual means that the function can be overridden in a polymorphic manner by a function of the same name and type in a derived class. If a virtual function is declared without providing an implementation, then it is referred to as a pure virtual function. A pure virtual function is a virtual function declared with the pure specifier, "=0". If a class specifies a pure virtual function, then any derived class needs to specify an implementation for that function member before that function member may be invoked. A class which contains at least one pure virtual function member is an abstract class.

FIG. 1 is a block diagram illustrating typical data structures used to represent an object. An object is composed of instance data (data members) and function members, which implement the behavior of the object. The data structures used to represent an object comprise instance data structure 101, virtual function table 102, and the function members 103, 104, 105. The instance data structure 101 contains a pointer to the virtual function table 102 and contains data members. The virtual function table 102 contains an entry for each virtual function member defined for the object. Each entry contains a reference to the code that implements the corresponding function member. The layout of this sample object conforms to models described in U.S. Pat. No. 5,297,284, entitled "A Method for Implementing Virtual Functions and Virtual Bases in a Compiler for an Object Oriented Programming Language," which is hereby incorporated by reference. In the following, an object will be described as an instance of a class as defined by the C++ programming language. One skilled in the art would appreciate that other object models can be defined using other programming languages.

An advantage of using object-oriented techniques is that these techniques can be used to facilitate the sharing of objects. For example, a program implementing the function members of an instantiated object (a "server program") can share the object with another program (a "client program"). To allow an object of an arbitrary class to be shared with a client program, interfaces are defined through which an object can be accessed without the need for the client program to have access to the class definitions at compile time. An interface is a named set of logically related function members. In C++, an interface is an abstract class with no data members and whose virtual functions are all pure. Thus, an interface provides a published protocol for two programs to communicate. Interfaces are typically used for derivation; a program defines (implements) classes that provide implementations for the interfaces the classes are derived from. Thereafter, objects are created as instances of these derived classes. Objects instantiated from a derived class implementing particular interfaces are said to "support" the interfaces. An object supports one or more interfaces depending upon the desired functionality.

When a client program desires to share an object, the client program needs access to the code that implements the interfaces for the object (the derived class code). To access the derived class code (also referred to as class code), each class implementation is given a unique class identifier (a "CLSID"). For example, code implementing a spreadsheet object developed by Microsoft Corporation may have a class identifier of "MSSpreadsheet," while code implementing a spreadsheet object developed by another corporation may have a class identifier of "LTSSpreadsheet." A persistent registry in each computer system is maintained that maps each CLSID to the code that implements the class. Typically, when a spreadsheet program is installed on a computer system, the persistent registry is updated to reflect the availability of that class of spreadsheet objects. So long as a spreadsheet developer implements each function member defined by the interfaces to be supported by spreadsheet objects and so long as the persistent registry is maintained, the client program can access the function members of shared spreadsheet objects without regard to which server program has implemented them or how they have been implemented.

Since an object may support some interfaces and not others, a client program would need to determine at runtime whether a particular object supports a particular interface. To enable this determination, every object supports the interface IUnknown, which contains a function member, QueryInterface, that indicates which interfaces are implemented for the object. The method QueryInterface is defined as follows:

virtual HRESULT QueryInterface (REFIID iid, void**ppv)=0;

The method QueryInterface is passed an interface identifier in parameter iid (of type REFIID) and returns in parameter ppv a pointer to the implementation of the identified interface of the object for which the method is invoked. If the object does not support the interface, then the method returns a false. The type HRESULT indicates a predefined status.

FIG. 2 is a symbolic representation of an object. In the following description, an object data structure is represented by the shape 201 labeled with the interfaces through which the object may be accessed. As shown, object 201 supports IInterface1 and IInterface2.

SUMMARY OF THE INVENTION

The present invention provides a system and method that allows application programs to use the file management capabilities implemented by shell through a file manager program. In a preferred embodiment, application programs are provided with an application programming interface (GetFileName API) to retrieve file names using a common dialog box implementation. The shell uses an interface (IShellView) to control a ShellView window in which the contents of a current folder are displayed and manipulated. The common dialog box implementation uses the IShellView interface so that it can provide the same behavior as the shell provides for managing files and folders. The ShellView window has an associated ShellView window procedure and an ShellView class. The ShellView window procedure processes messages for the ShellView window. The ShellView class provides an implementation of the IShellView interface. Since the GetFileName API uses the implementation of the IShellView interface provided by the file manager program, the application programs that use the GetFileName API provide the same user interface and the same functionality that is provided by the file manager program.

A preferred embodiment provides a method in a computer system for allowing comprehensive object manipulation to a user during a get object name function. The computer system has an object manager that provides comprehensive object manipulation to the user. Upon invocation of the get object name function, the method creates a dialog window for receiving the name of an object. The method then creates a view window provided by the object manager and provides a folder of objects to the view window for display and manipulation. Under control of the view window, the method then receives user requests to manipulate the displayed objects. The method then manipulates the displayed object, and notifies the dialog window of changes in state of the displayed objects. Under control of the dialog window, the method updates the dialog window to reflect the change in the state wherein the view window provides a comprehensive object manipulation to a user within context of a get object name function.

DETAILED DESCRIPTION OF THE INVENTION

Figure 1:
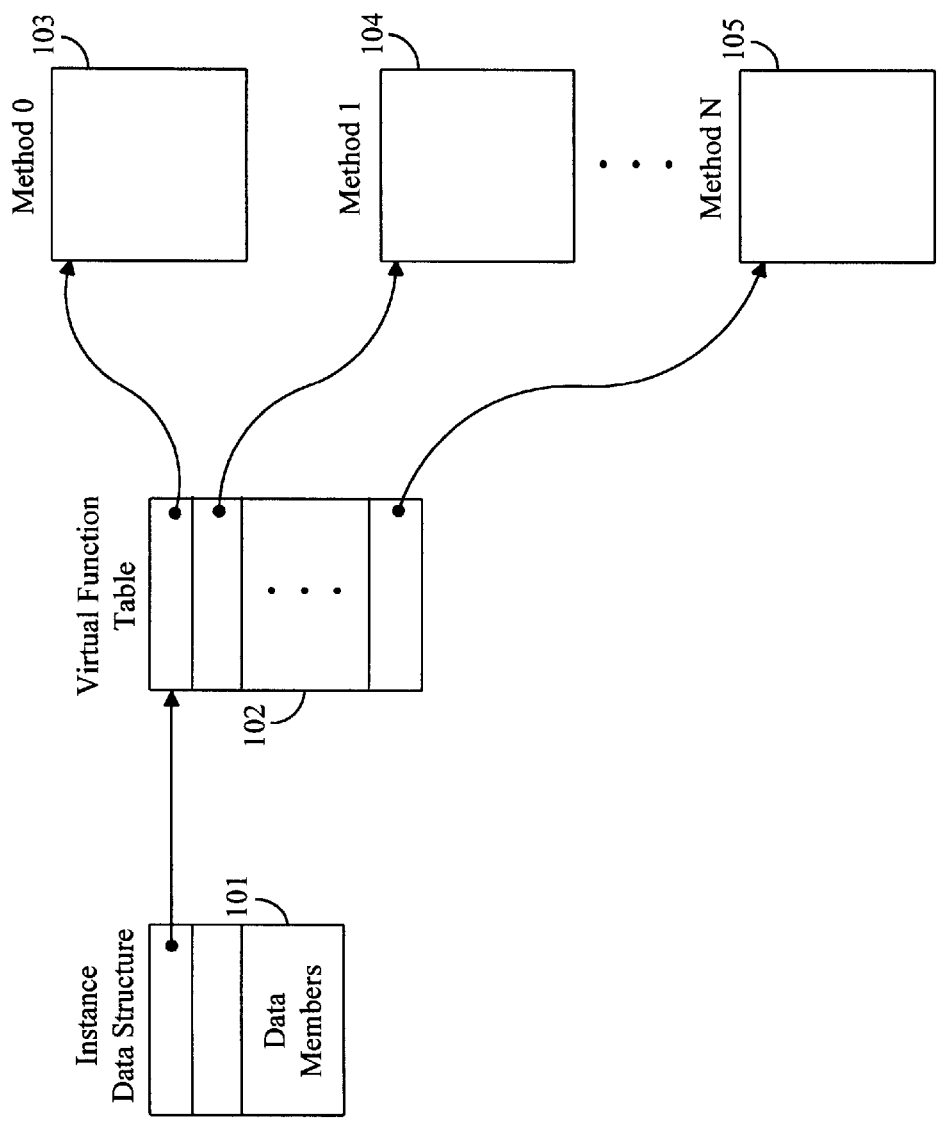
FIG. 1 is a block diagram illustrating typical data structures used to represent an object.
Figure 2:
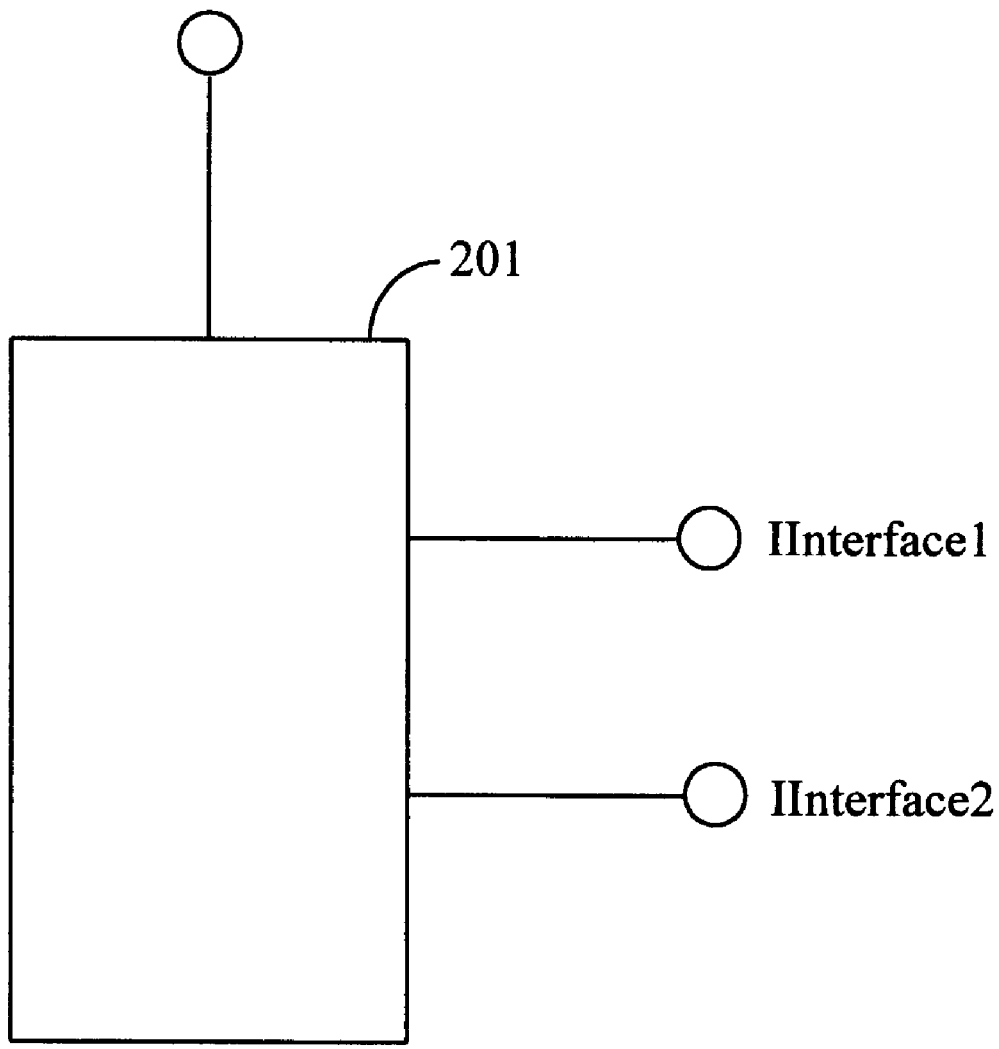
FIG. 2 is a symbolic representation of an object.

The present invention provides a system and method that allows application programs to use the file management capabilities implemented by shell through a file manager program. In a preferred embodiment, application programs are provided with an application programming interface (GetFileName API) to retrieve file names using a common dialog box implementation. The shell uses an interface (IShellView) to control a ShellView window in which the contents of a current folder are displayed and manipulated. The common dialog box implementation uses the IShell-View interface so that it can provide the same behavior as the shell provides for managing files and folders. The ShellView window has an associated ShellView window procedure and an ShellView class. The ShellView window procedure processes messages for the ShellView window. The ShellView class provides an implementation of the IShellView interface. Since the GetFileName API uses the implementation of the IShellView interface provided by the file manager program, the application programs that use the GetFileName API provide the same user interface and the same functionality that is provided by the file manager program.

To provide the same behavior as the shell for managing folders and files, an application program invokes the Get-FileName API which provides a Dialog window (or other type of window) that contains a ShellView window. The GetFileName API first instantiates a ShellFolder object corresponding to the folder to be displayed in the ShellView window. The ShellFolder object provides an implementation of the IShellFolder interface. The IShellFolder interface provides methods for accessing information relating to the folder, for enumerating the contents of the folder and for retrieving a display name for each item (e.g., file or folder) within the folder. The IShellFolder interface also provides a method that creates a ShellView object associated with the folder.

The GetFileName API then creates a ShellView object that provides the IShellView interface. The IShellView interface provides methods for creating and displaying the ShellView window and manipulating the contents of the ShellView window. After the GetFileName API creates the Dialog window, the GetFileName API directs the ShellView object to create the ShellView window.

The GetFileName API provides an implementation of a class FileBrowser that includes an implementation of an IShellBrowser interface and an ICommDlgBrowser interface. The IShellBrowser interface provides methods through which a ShellView object can communicate with the Dialog window. For example, if the Dialog window were to include menus or a tool bar, then methods of the IShellBrowser interface could be used by the ShellView object to add to the menu or the tool bar of the Dialog window any additional menu or toolbar items that the ShellView window supports. The ICommDlgBrowser interface provides methods through which the ShellView object can allow the GetFileName API to override the default behavior of the ShellView object. For example, if a user double clicks (i.e., indicating a default action to be performed), on the name of a folder listed in the ShellView window, the ShellView object invokes a method of the ICommDlgBrowser interface. The invocation of this method notifies the GetFileName API that a default behavior has been requested by the user. In this example, the Get-FileName API would direct the creation of another Shell-View object to control the displaying of the contents of the selected folder.

Figure 3:
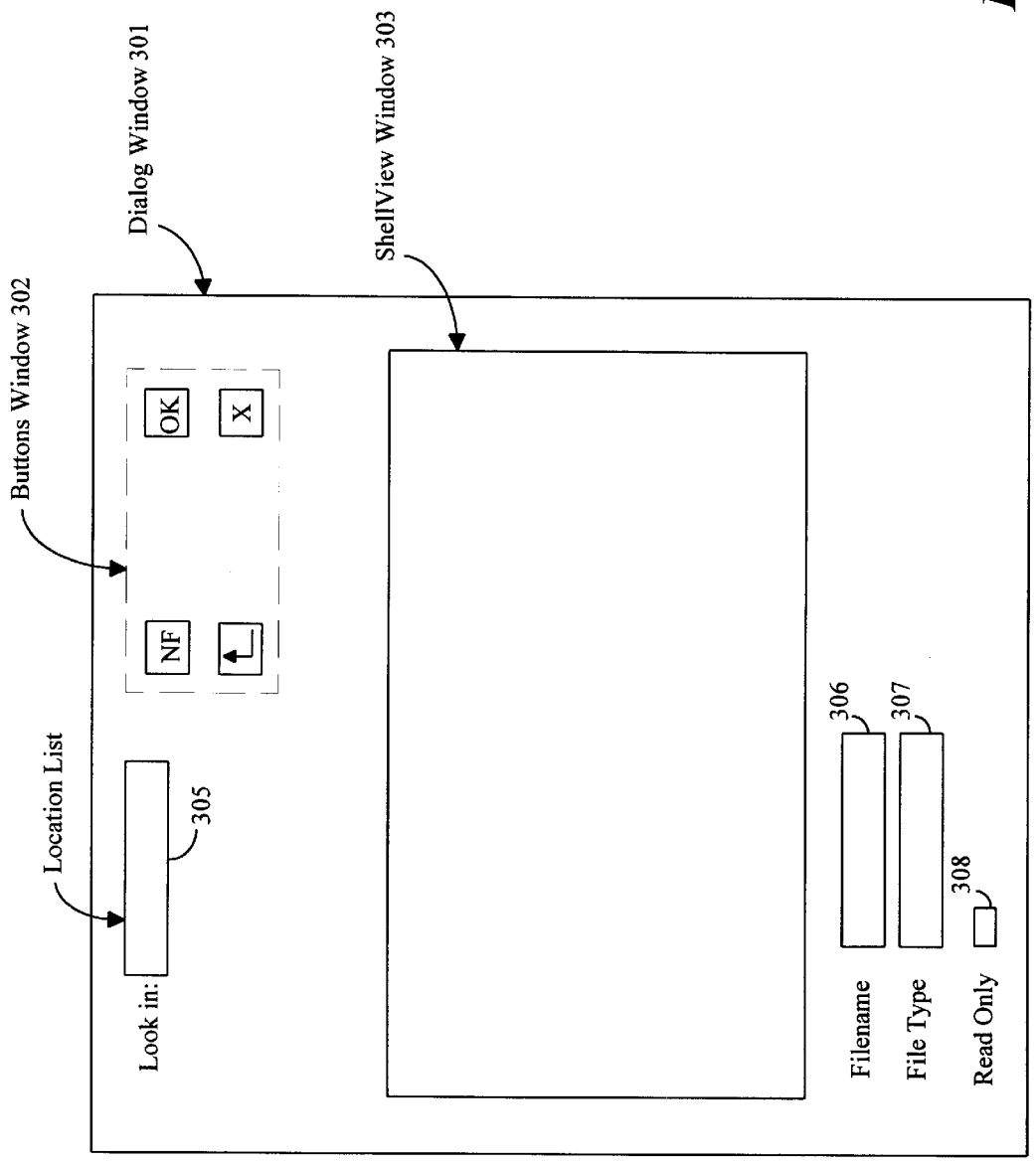
FIG. 3 is a diagram of the Dialog window associated with the GetFileName API.

The Dialog window controls the inputting of the file name of the file to open. A similar window could input the name of a file when saving a file. FIG. 3 is a diagram of the Dialog window associated with the GetFileName API. The application program would typically invoke the GetFileName API to display a dialog box through which the user may select a file or input the name of a file. The Dialog window 301 contains a Buttons window 302 and a ShellView window 303. The Dialog window also contains a LookIn listbox 305, a FileName field 306, a FileType field 307, and a ReadOnly field 308. The LookIn listbox 305 displays a location list of folders. The FileName field 306 inputs a file name or specification of a list of file names. The FileType field 307 inputs file type information. The ReadOnly field 308 inputs whether the file is to be opened in read only mode. The Buttons window 302 contains buttons to create a new folder, to select the parent folder, to cancel the open file, and to indicate OK. The ShellView window 303 displays information on the items of the current folder. The Shell-View window is implemented by the shell. The various windows each have window procedures for receiving and processing messages.

In operation, the application program invokes the Get-FileName API to retrieve the name of a file, for example, to open. The GetFileName API creates the Dialog window and initializes the Dialog window procedure to process the Dialog window messages. The LookIn listbox 305 provides a hierarchical listing of folder names, known as a location list. The location list preferably contains the predefined items "Desktop," "My Computer," and "Network Neighborhood," and all the drives in "My Computer." In addition, the location list contains all subfolders down to and including the current folder. For example, if the current folder were C:\Doc\Patents, the location list may contain the following.

Desktop
  My Computer
    A:
    C:
      DOCS
        Patents
    X:
  Network:Neighborhood.

The "Network Neighborhood" is a folder that identifies the computers connected through a network.

A user can select a folder listed in the LookIn listbox to have its contents displayed in the ShellView window. A user can also browse the location list to select the folder in which to have its subfolders displayed in the location list. A user can also select a folder listed in the ShellView window to have the selected folder become the current folder in the location list. A user can either enter the name of the file to open in the FileName field or select a file name listed in the ShellView window and then select the OK button to designate the file to open.

Since the ShellView window is the same window as implemented by the file manager program of the shell, the ShellView window supports the same functionality and user interface as tile file manager program supports. For example, when a user right clicks on an item in the ShellView window, the ShellView object directs the displaying of a pop-up menu of file management capabilities associated with that item. The file management capabilities may include deleting, renaming, or moving a file.

Figure 4:
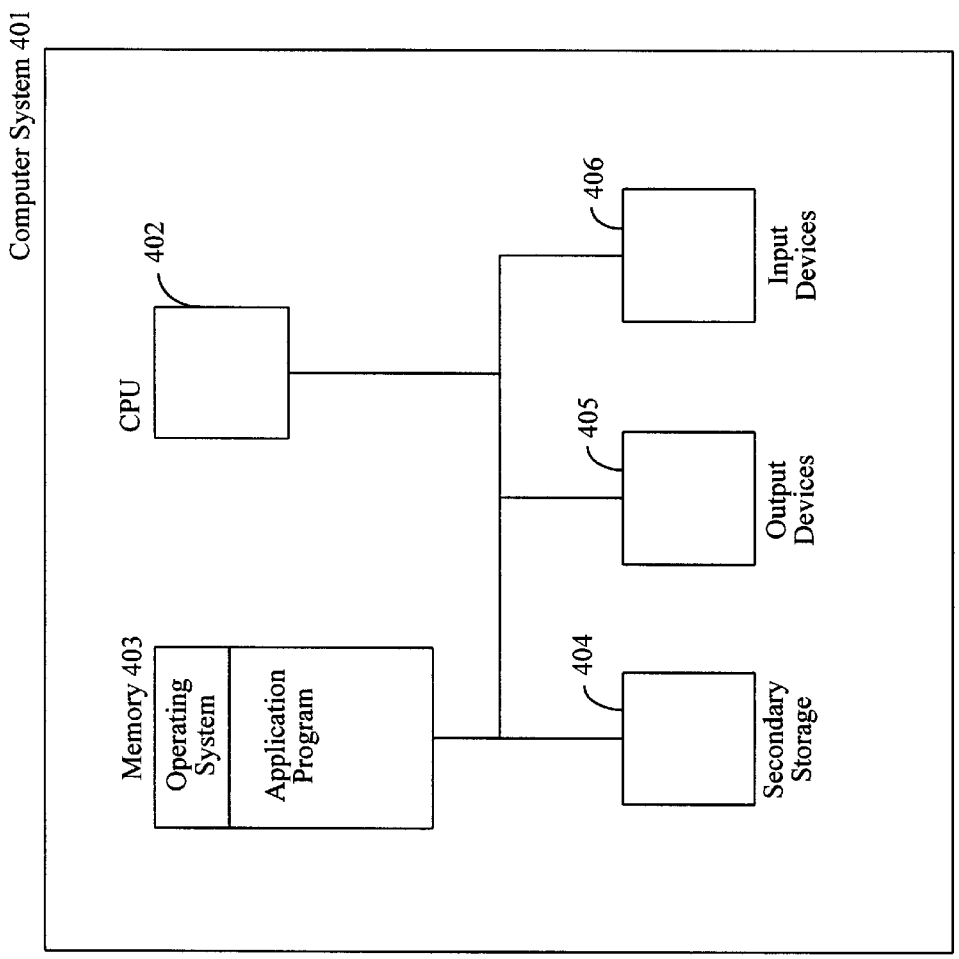
FIG. 4 is a block diagram illustrating a sample configuration of a computer system for practicing the present invention.

FIG. 4 is a block diagram illustrating a sample configuration of a computer system for practicing the present invention. The computer system 401 includes a central processing unit (CPU) 402, a memory 403, secondary storage 404, output devices 405, and input devices 406. The CPU controls the execution of the programs stored in memory. The programs stored in memory include the operating system and application programs of a preferred embodiment. The CPU interacts with secondary storage (e.g., disk drives) to store and retrieve data. The CPU inputs data from a user through input devices (e.g., mouse and keyboard) and output data to a user through output devices (e.g., a display or printer).

Figure 5:
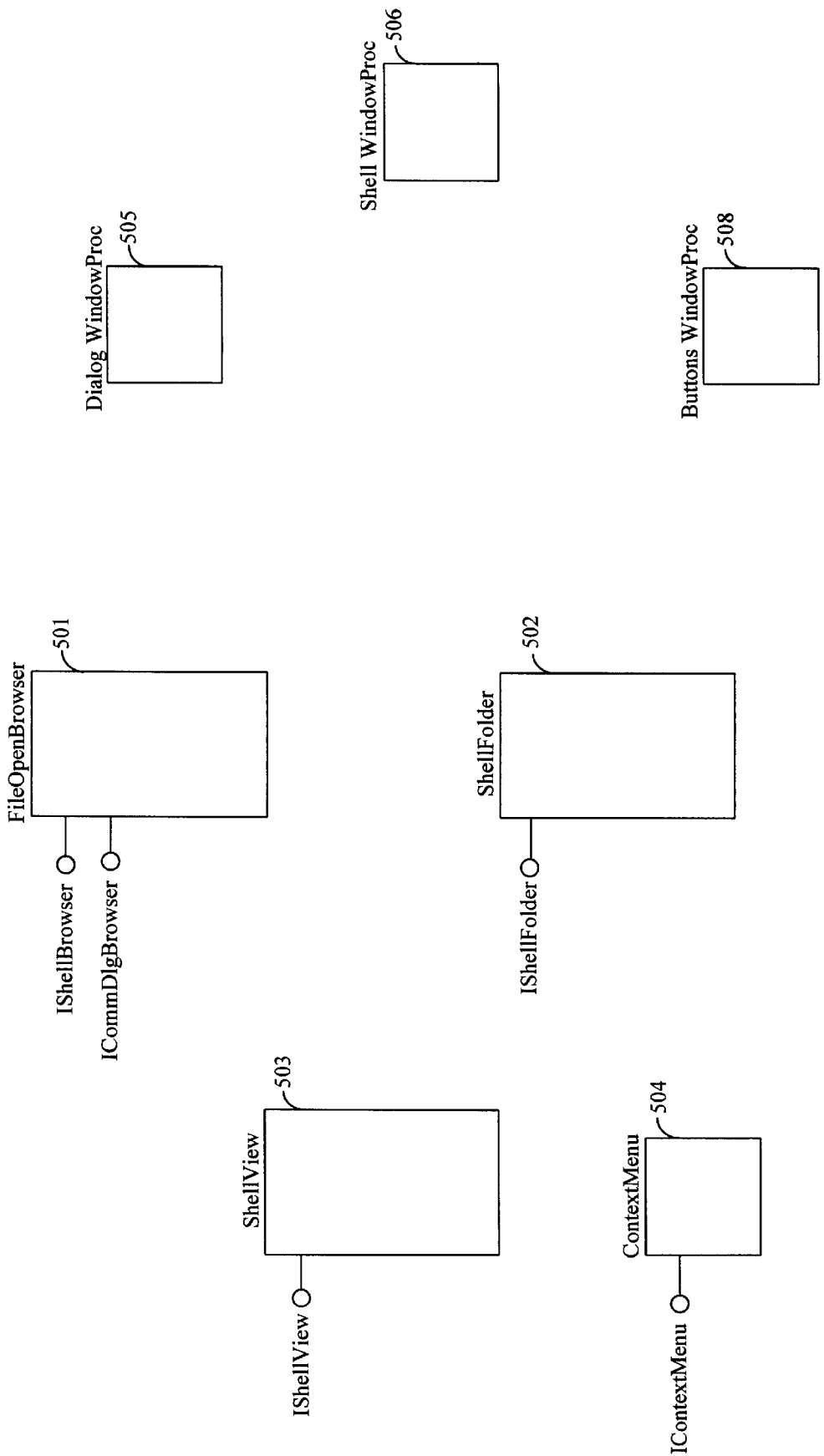
FIG. 5 is a block diagram illustrating data structure and program layout of the application program in the memory of the computer system.

FIG. 5 is a block diagram illustrating the data structure and program layout of the GetFileName API in the memory of the computer system. The GetFileName API includes a FileOpenBrowser object 501, a ShellFolder object 502, a ShellView object 503, and a ContextMenu object 504. The GetFileName API also includes a Dialog window procedure, 505, a ShellView window procedure 506, and a Buttons window procedure. As described in the following, the objects and window procedures interact to implement a preferred embodiment of the present invention. A description of each of the interfaces is provided followed by a description of the window procedures.

IShellFolder

```
interface IShellFolder: IUnknown
    BindToObject(ObjectIdentifier, riid, ppvOut)
    CreateViewObject(hwndOwner, riid, ppvOut)
    GetAttributesOf(ObjectIdentifier, attributes)
    GetUIObjectOf(ObjectIdentifiers, riid, ppvOut)
    GetDisplayNameOf(ObjectIdentifier, Name)
    SetNameOf(ObjectIdentifier,       Name,
        NewObjectIdentifier)
    EnumObjects(ppenumIDList)
}
```

The IShellFolder interface provides methods for accessing the items within a folder. A folder is a collection of items, such as folders and files or other objects that have an implementation of the IShellFolder interface. Thus, a collection of folders form a hierarchy. Each item in a folder has an identifier. Each folder includes the identifier of the items it contains and the attributes of each item. The attributes include a display name of the item, an indication whether the item is read-only, etc. An item can be uniquely identified by the sequence of identifiers ("an ObjectIdentifier") from the root folder, that is, the Desktop. The ObjectIdentifier is a list of the folder identifiers from the root to the item. An ObjectIdentifier can be absolute (from the root folder) or relative (to the current folder).

The method IShellFolder::BindToObject instantiates a ShellFolder object for an item contained within this folder and returns a pointer to an interface of the new ShellFolder object. (In the following, the use of the term "this" refers to the instance in which the method is being invoked.) The passed parameter ObjectIdentifier identifies the item relative to this folder. The passed parameter riid identifies the interface to return (e.g., IID-IShellFolder). The returned parameter ppvOut is a pointer to the interface identified in parameter riid of the newly instantiated ShellFolder object. The new ShellFolder object contains data describing the contents of the folder.

The method IShellFolder::CreateViewObject instantiates a ShellView object for this folder. The passed parameter hwndOwner identifies the window that owns the ShellView object. In the implementation of the GetFileName API, the Dialog window owns the ShellView window. The passed parameter riid identifies the IShellView interface. The returned parameter ppvOut points to the IShellView interface of the instantiated ShellView object.

The method IShellFolder::GetAttributesOf returns the attributes of an item of this folder. The passed parameter ObjectIdentifier identifies the item relative to this folder. The return parameter attributes contains the attributes. The attributes include whether the item can be copied, moved, and deleted, and whether the item is read-only, a folder, or a file, etc.

The method IShellFolder::GetUIObjectOf creates a ContextMenu object for an item or group of items. The parameter ObjectIdentifiers identifies the item relative to this folder. The parameter riid indicates the interface to return, and the parameter ppvOut is a pointer to the returned interface of the ContextMenu object. This method can return pointers to an IContextMenu interface, an IExtractIcon interface, or other interfaces for accessing behavior of an item. The IContextMenu interface as described below in detail provides methods for accessing a menu for manipulating the item. The IExtractIcon interface provides methods for retrieving an icon associated with the item.

The method IShellFolder::GetDisplayNameOf returns the display name of an item. The passed parameter ObjectIdentifier identifies the item relative to this folder. The returned parameter Name contains the display name of the item identified by parameter ObjectIdentifier.

The method IShellFolder::SetNameOf sets the name of an item. The passed parameter ObjectIdentifier identifies the item relative to this folder. The passed parameter Name contains the new name. The returned parameter NewObjectIdentifier contains the new ObjectIdentifier, which may have changed because of the change in name.

The method IShellFolder::EnumObjects returns a pointer to an enumerator interface for enumerating the contents of this folder. The returned parameter ppenumIDList is a pointer to the enumerator interface. The methods of the enumerator interface allow for enumeration of the items in this folder. The method of the enumerator interface allows for the retrieval of the ObjectIdentifiers of the items in this folder.

IShellView

```
interface IShellView: IUnknown
{
    GetWindow(hwndShellWindow)
    UIActivate(state)
    Refresh( )
    CreateViewWindow(settings, pIShellBrowser, prcView,
        hwndShellWindow)
    DestroyViewWindow( )
    GetCurrentInfo(settings)
    SelectItem(ObjectIdentifiers, flag)
    GetItemObject(ObjectIdentifier, riid, ppv)
}
```

The IShellView interface provides methods for creating, displaying, manipulating, and destroying a ShellView window. When a ShellView object is created by a ShellFolder object, the ShellView object is initialized to contain a pointer to the IShellFolder interface. Using the methods of that IShellFolder interface, the ShellView object can retrieve the contents of the folder for which it was created.

The method IShellView::GetWindow returns the handle for the ShellView window.

The method IShellView::UIActivate is invoked whenever the activation of the ShellView window changes as a result of an event external to the ShellView window. The passed parameter state indicates whether the ShellView window is to be deactivated, loses the focus, or is given the focus. For example, if the user clicks in the FileName field, then this method is invoked to indicate a change in activation. This method sends a message to the ShellView window to effect the change in the activation status.

Figure 6:
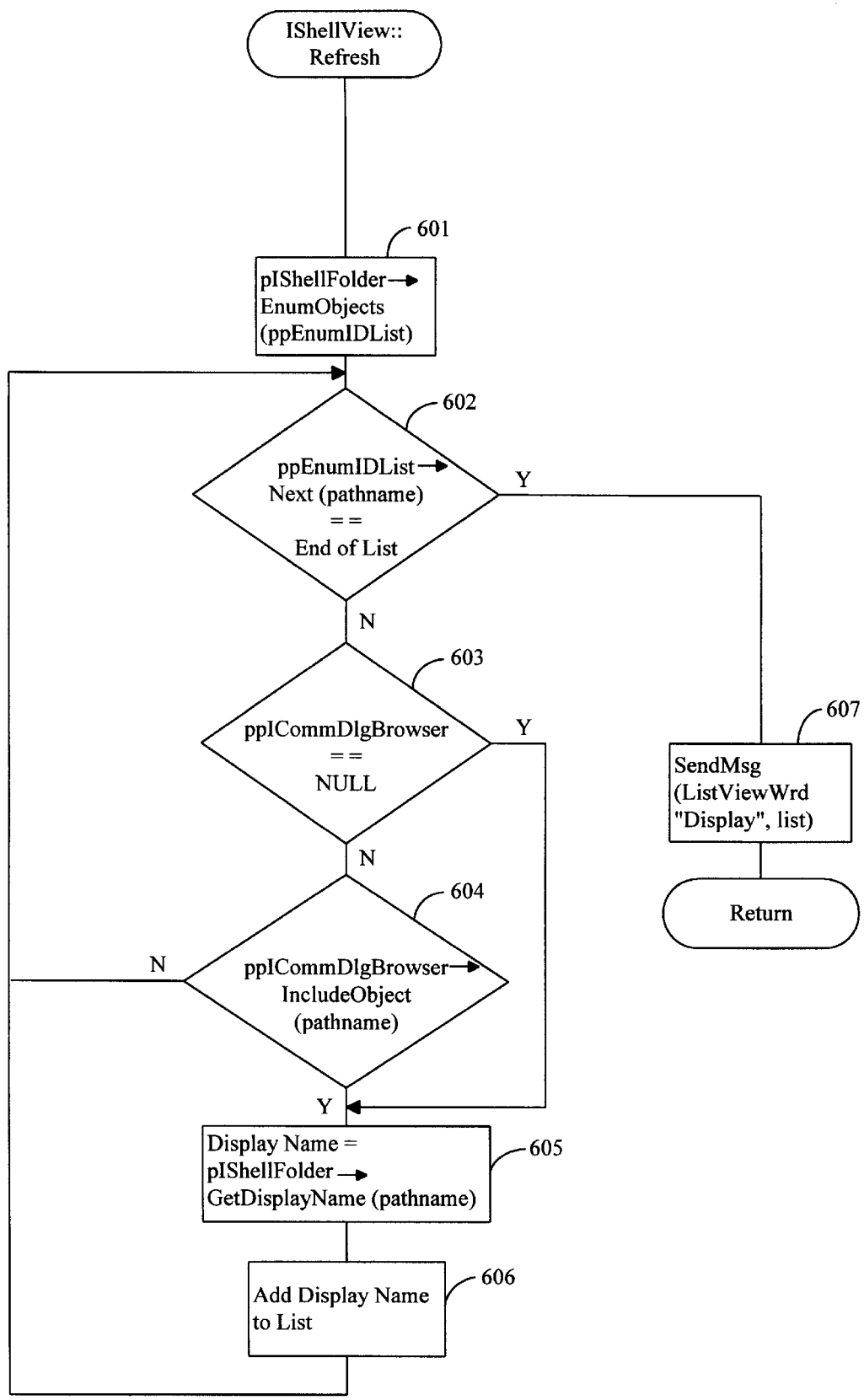
FIG. 6 is a flow diagram of the method IShellView::Refresh.

FIG. 6 is a flow diagram of the method IShellView::Refresh. The method Refresh refreshes the content of the ShellView window. The content is refreshed by retrieving the items from the folder associated with this ShellView object and displaying the display names of the retrieved items. The ShellView window may need to be refreshed after items are deleted from the associated folder. In step 601, the method retrieves an enumerator for the ShellFolder object associated with this ShellView object. In steps 602 through 606, the method loops retrieving the items in the ShellFolder object and adding the items to a list to be displayed. In step 602, the method selects the next item in the ShellFolder object. If all the items in the ShellFolder object have already been selected, then the method continues at step 607, else the method continues at step 603. In step 603, the method determines whether the ShellView object has been instantiated as part of a common dialog box implementation. If the ICommDlgBrowser interface has been implemented, then it is part of a common dialog box implementation and the method continues at step 604, else the method continues at step 605. In step 604, the method determines whether the selected item should be displayed by invoking the method ICommDlgBrowser::IncludeObject. If the selected item should be displayed, then the method continues at step 605, else the method loops to step 602 to select the next item. In step 605, the method retrieves the display name of the selected item by invoking the method IShellFolder::GetDisplayNameOf. In step 606, the method adds the display name to the list and loops to step 602 to select the next item. In step 607, the method repaints the ShellView window and returns.

Figure 7:
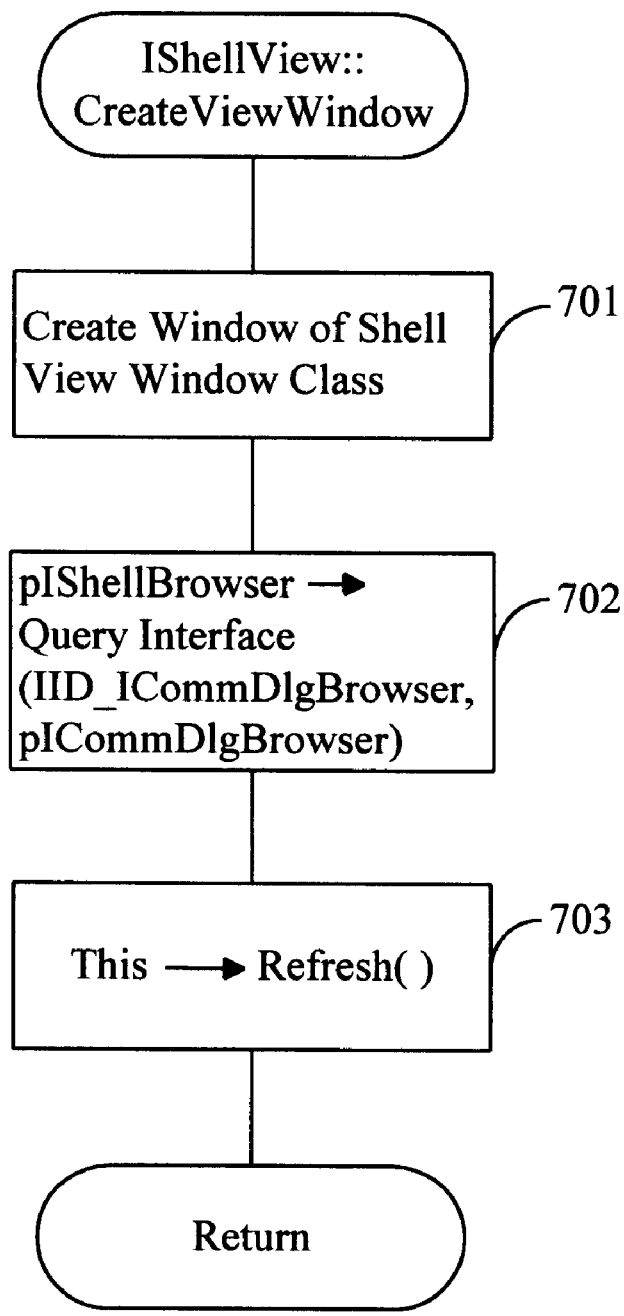
FIG. 7 is a flow diagram of the method IShellView::CreateWindow.

FIG. 7 is a flow diagram of the method IShellView::CreateWindow. The method CreateViewWindow creates and displays a ShellView window. The passed parameter settings are the folder settings (e.g., whether to display icons associated with item) to control the display of the items in the folder. The passed pointer pIShellBrowser points the ShellBrowser object. The passed parameter prcView indicate the rectangle at which to position the ShellView window. The returned parameter hwndShellWindow points to the handle of the newly created ShellView window. In step 701, the method creates a ShellView window. In step 702, the method determines whether the ShellView window is being created for an application program. The GetFileName API implements the interface ICommDlgBrowser. The method invokes the method IShellBrowser::QueryInterface to determine if the interface ICommDlgBrowser is implemented. In step 703, the method invokes the method IShellView::Refresh to display the contents of the ShellFolder and the method then returns.

The method IShellView::DestroyViewWindow destroys the ShellView window associated with this ShellView object. The method IShellView::GetCurrentInfo returns the current folder setting for this ShellView object. The returned parameter settings contain the folder settings. The folder settings include information that controls the display of the folder contents (e.g. the size of the icons).

Figure 8:
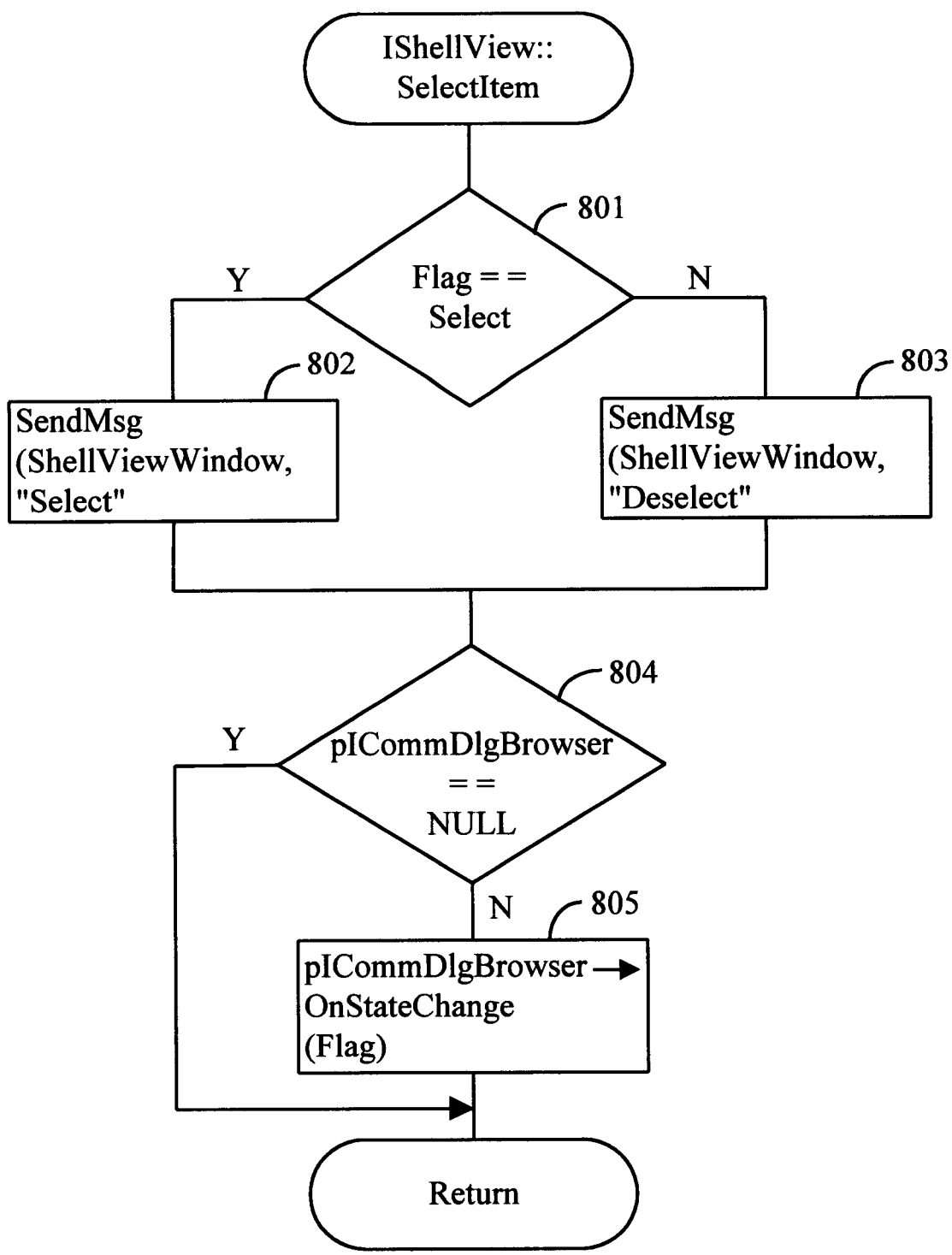
FIG. 8 is a flow diagram of the method IShellView::SelectItem.

FIG. 8 is a flow diagram of the method IShellView::SelectItem. The method SelectItem sets the items to selected or deselected in the ShellView window. The passed parameter ObjectIdentifiers identify a list of items of the ShellView window to select or deselect. The passed parameter flags indicates whether the items are to be selected or deselected. In step 801, if the passed flag indicates that the items are selected, then the method continues at step 802, else the method continues at step 803. In step 802, the method sends a "select" message to the ShellView window. In step 803, the method sends a "deselect" message to the ShellView window. In step 804, if the ICommDlgBrowser interface is not implemented by the program, then the method returns, else the method continues at step 805. In step 805, the method notifies the GetFileName API of a change in state of the selection within the ShellView window and returns. The method notifies the GetFileName API by invoking the method ICommDlgBrowser:: OnStateChange.

The method IShellView::GetItemObject returns a pointer to designated interface of an item. This method instantiates a ContextMenu object for the item. The passed parameter ObjectIdentifier identifies the item. The passed parameter riid identifies the interface of the ContextMenu object to be returned. The returned parameter ppv is a pointer to the interface of the ContextMenu object. The interface may be the IContextMenu interface or the IDataObject interface. The IDataObject interface is described in "Inside OLE 2" published by Microsoft Press, which is hereby incorporated by reference.

IShellBrowser interface IShellBrowser: IUnknown
{
    GetWindow(hwndDialogWindow)
    InsertMenusSB(hmenuShared, lpMenuWidths)
    SetMenuSB(hmenuShared, holemenu, hwndActiveObject)
    RemoveMenusSB(hmenuShared)
    SetStatusTextSB(StatusText) BrowseObject
        (ObjectIdentifier, flags)
    GetControlWindow(hwndToolbar)
    SendControlMsg(uMsg, wParam, lParam, pret)
    QueryActiveShellView(ppshv)
    SetToolBarItems(lpButtons, nButtons, flags)
}

The IShellBrowser interface provides methods for controlling the Dialog window. The GetFileName API provides an implementation for each of these methods. The IShellBrowser interface allows the ShellView object to interact with its container object, logically, the ShellBrowser object.

The method IShellBrowser::GetWindow returns the handle of the Dialog window associated with this ShellBrowser object. The returned parameter phwndDialogWindow is a pointer to the Dialog window. The methods InsertMenusSB, SetMenuSB, and RemoveMenuSB of the IShellBrowser interface allows for the menus of the container window to modified by the ShellView object. Since a dialog box has no menus, these methods can be implemented to have no functional effect when the ShellView object asks to integrate menus. The integration of menu is described in patent application Ser. No. 07/984,868, entitled "Method and System for In-Place Interaction with Embedded Objects," filed on Dec. 1, 1992 which is hereby incorporated by reference. The method IShellBrowser SetStatusTextSB sets the text of the status line of the Dialog window.

The method IShellBrowser::BrowseObject controls the browsing through another folder. The passed parameter ObjectIdentifier identifies the path to the folder that is to be browsed. The passed parameter flags indicates whether the path is absolute or relative or whether the parent folder is to be browsed.

The method IShellBrowser::GetControlWindow returns the handle to the toolbar window. The returned parameter hwndToolbar is the handle.

The method IShellBrowser::SendControlMsg sends the designated messages to the toolbar or window. The passed parameters uMsg, wParam, and lParam identify the message. The returned parameter pret indicates the result.

The method IShellBrowser::QueryActiveShellView returns a pointer to the active ShellView object associated with the ShellBrowser object. The returned parameter ppshv is a pointer to the ShellView object.

The method IShellBrowser::SetToolBarItems is invoked to set the toolbar for the Dialog window. The passed parameters lpButtons and nButtons specify the array of buttons to add. The passed parameter flags specify whether the buttons are to be merged or added to the end of the toolbar.

ICommDlgBrowser

```
interface ICommDlgBrowser: IUnknown
    OnDefault(ppshv)
    OnStateChange(uChange)
    IncludeObject(ObjectIdentifier)
}
```

The ICommDlgBrowser interface provides a call back mechanism through which a ShellView object can notify its container ShellBrowser object of certain events it may want to handle. The method ICommDlgBrowser::OnDefault is called by the ShellView object when the user double clicks in the ShellView window, selects the default menu item off an items context menu, or presses enter. The passed parameter ppshv is a pointer to the ShellView object. The method returns OK as its value if it processed the command. This method allows the ShellBrowser object the opportunity to, for example, change the current folder to the folder selected by the double click. The method retrieves the currently selected items by invoking the method IShellView::GetItemObject requesting a pointer to the IDataObject interface. The method then invokes the methods of the IDataObject interface to retrieve data that identifies the items selected.

The method ICommDlgBrowser::OnStateChange is called when the state of the ShellView Window changes. The states include when the focus changes, when the selection changes, or when an item is renamed. The passed parameter uChange indicates the state that changed. This method allows the ShellBrowser object the opportunity to update the fields of the Dialog window. For example, if the selection changes, the FileName field is updated to include the list of the selected items. As discussed above, the list of the selected items can be retrieved using the IDataObject interface.

Figure 9:
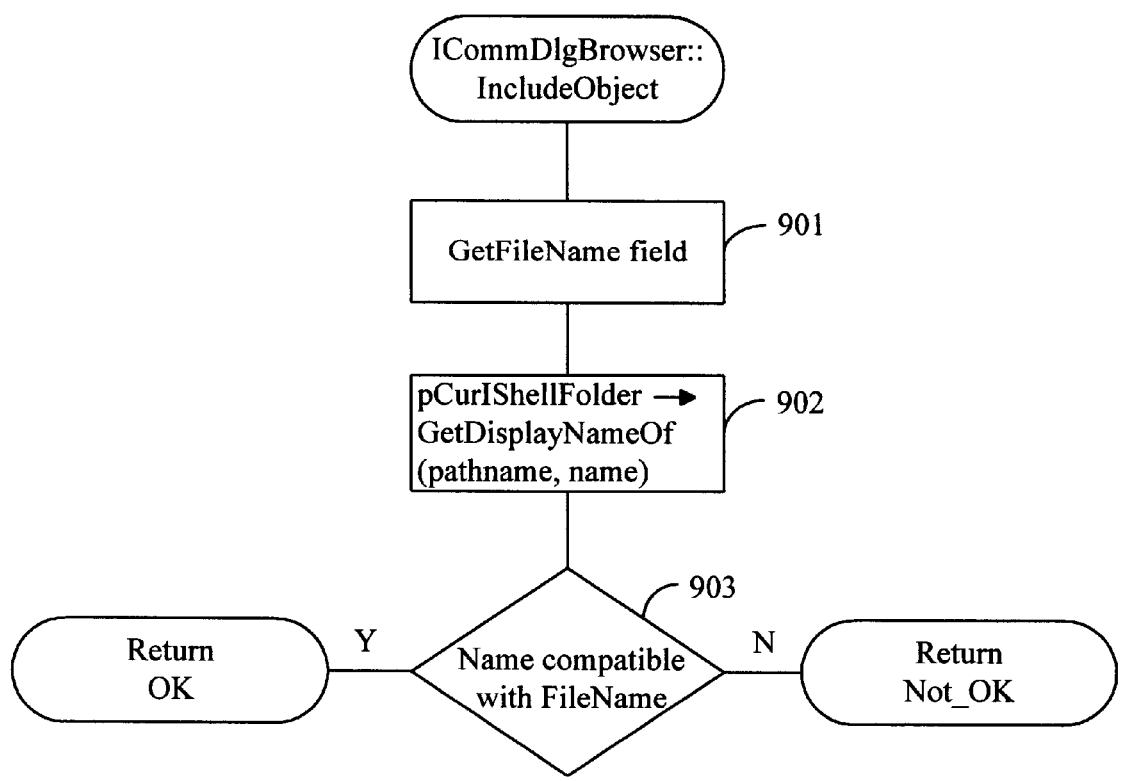
FIG. 9 is a flow diagram of the method ICommDlg-Browser::IncludeObject.

FIG. 9 is a flow diagram of the method ICommDlgBrowser::IncludeObject. The method IncludeObject indicates whether an item should be included in the ShellView window. The passed parameter ObjectIdentifier is the path name to an item relative to the current folder. The method returns OK as its value if the item is to be included. In step 901, the method retrieves the FileName field of the Dialog window. In step 902, the method retrieves the display name of the passed item by invoking the method IShellFolder::GetDisplayNameOf for the current ShellFolder object. In step 903, if the display name is compatible with the FileName field, then the method returns an OK, else the method returns a Not_OK. A display name is compatible with the FileName field when, for example, display name matches the wild card specification in the FileName field.

IContextMenu

```
interface IContextMenu: IUnknown
{
    QueryContextMenu(hmenu);
    InvokeCommand (command);
}
```

The IContextMenu interface provides methods for retrieving a menu associated with an item and for invoking the behavior when a menu item is selected. A ContextMenu object is created for an item or list of items.

The method IContextMenu::QueryContextMenu initializes the menu for the item for which it was instantiated. The parameter hmenu is a handle to the menu into which the menu items for the item are to be stored. The menu items can be either standard for the item or extended menu items that are defined for the type of the menu item. The extended menu items are defined in a global registry.

The method IContextMenu::InvokeCommand is used to perform the behavior of a menu item. The parameter command identifies the command. The method performs the behavior for the standard menu items or invokes code specific to the extended menu items.

Dialog Window Procedure

Figure 10:
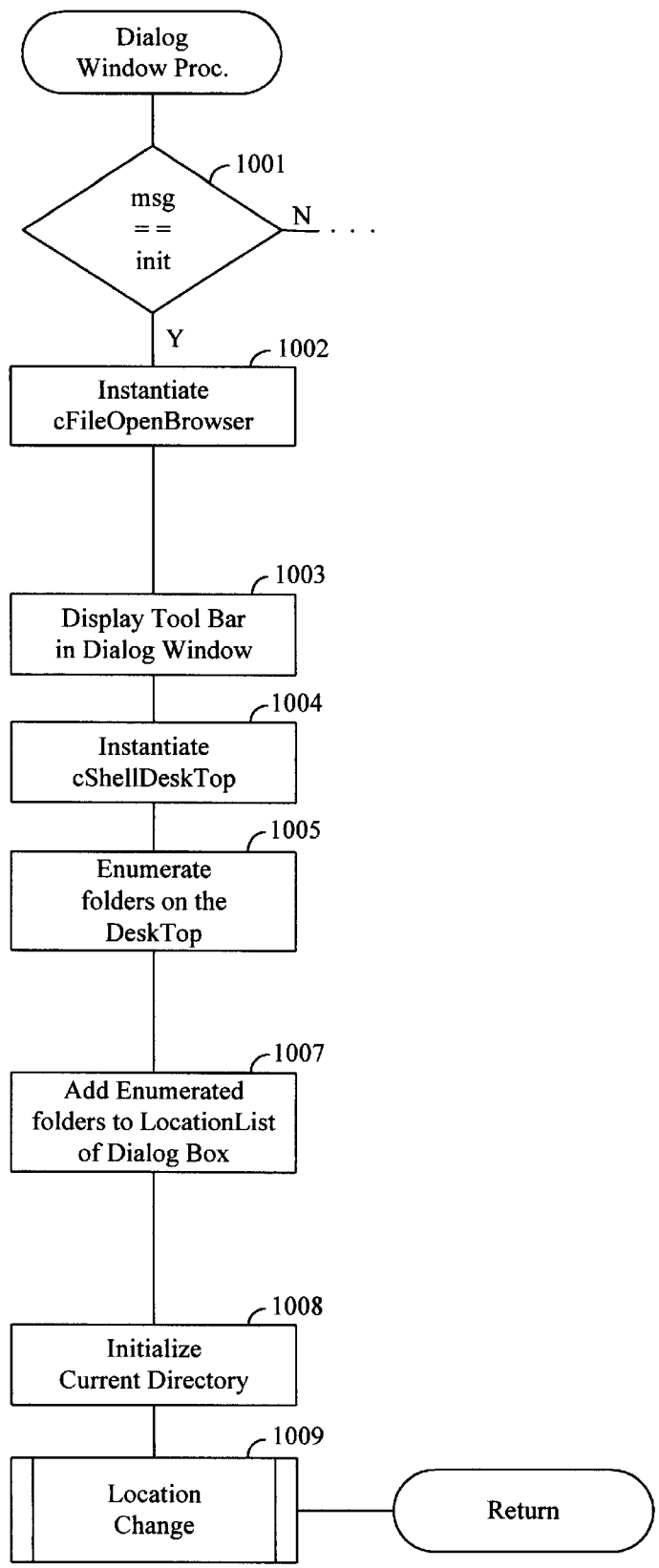
FIGS. 10 through 12 are flow diagrams of portions of the Dialog window procedure.
Figure 11:
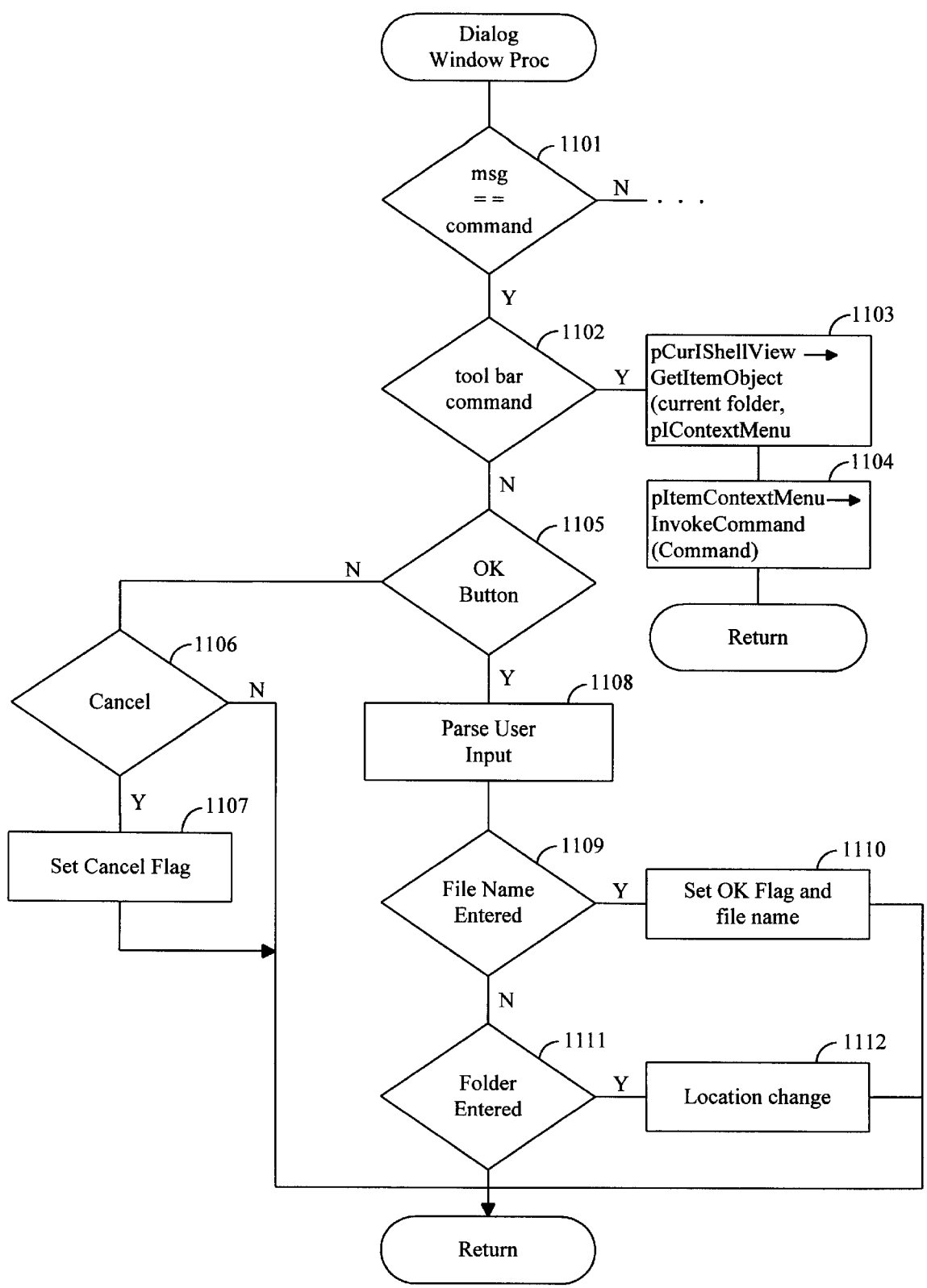
Figure 12:
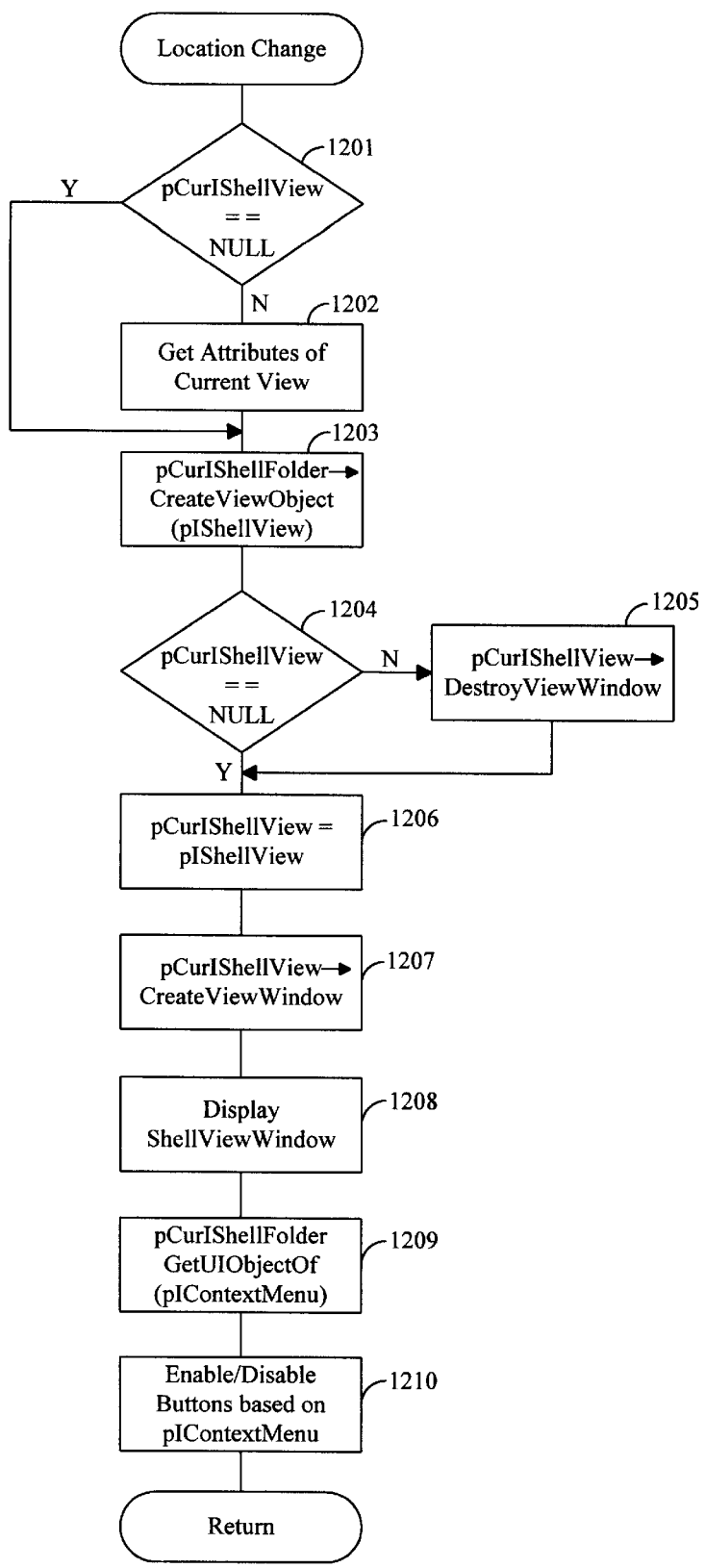

FIGS. 10 through 12 are flow diagrams of portions of the Dialog window procedure. FIG. 10 illustrates the processing of an initialization message. In response to an initialization message, the procedure instantiates an FileOpenBrowser object and an ShellFolder object. The procedure then displays the current folder in the ShellView window. In step 1001, if the message is an initialization message, then the procedure continues at step 1002, else the procedure continues to check for another message. In step 1002, the procedure instantiates a FileOpenBrowser object and stores a pointer (pIShellBrowser) to the object. In step 1003, the procedure creates and displays a Buttons window for the Dialog window. In step 1004, the procedure instantiates a ShellFolder object for the Desktop and retrieves a pointer to its IShellFolder interface. The desktop is logically the root of the folder heirarchy. In step 1005, the procedure enumerates the folders in the ShellFolder object. The procedure enumerates the items by invoking the method IShellFolder::EnumObjects to get an enumerator for the items in the folder. In step 1008, the procedure adds the enumerated folders to the location list. In step 1008, the procedure retrieves the name of the current folder and instantiates a ShellFolder object for the current folder and stores its pointer. In step 1009, the procedure invokes the function LocationChange to initialize the ShellView window with information for the current folder. The function LocationChange is described below in detail.

FIG. 11 is a flow diagram that illustrates the processing of a command message by the Dialog window procedure. A command message indicates that a toolbar command or an enter command has been selected. In step 1101, if the message is a command message, then the procedure continues at step 1102, else the procedure continues to check for another message. In step 1102, if the command is a toolbar command, then the procedure continues at step 1103, else the procedure continues at step 1105. In step 1103, the procedure instantiates and retrieves a pointer to a ContextMenu object for the current folder. In step 1104, the procedure dispatches the toolbar command to be processed and returns. In step 1105, if the command is the OK button or the enter key, then the procedure continues at step 1108, else the procedure continues at step 1106. In step 1106, if the command is the cancel command, then the procedure continues at step 1107, else the procedure returns. In step 1107, the procedure sets a flag indicating that cancel was selected. A message loop for the dialog box detects this flag and returns to the GetFileName API. In step 1108, the procedure parses the user input in the FileName field. In step 1109, if a file name was entered in the FileName field, then the procedure continues at step 1110, else the procedure continues at step 1111. In step 1110, the procedure sets a flag indicating that the OK button was selected and sets information indicating the selected items. Control is then transferred to the GetFileName API as described above. In step 1111, if the user entered a folder name, then the procedure continues at step 1112, else the procedure returns. In step 1112, the procedure invokes the function LocationChange to effect the change of the folder and returns.

FIG. 12 is a flow diagram of the function LocationChange. In step 1201, if there is no current ShellView object, then the function continues at step 1203, else the function continues at step 1202. In step 1202, the function retrieves the folder settings of the current ShellView object by invoking the method IShellView::GetCurrentInfo. In step 1203, the function creates a ShellViewObject for the current folder by invoking the method IShellFolder::CreateViewObject. In steps 1204, 1205, and 1206, if there is already a ShellView object, the function destroys it and sets the new ShellView object to be the current ShellView object. In step 1207, the function creates a ShellView window for the current ShellView object. In step 1208, the function displays the ShellView window. In step 1209, the function retrieves a ContextObject for the current folder by invoking the method IShellFolder::GetUIObjectOf. In step 1210, the function enables the buttons appropriate for the menu indicated by the method IContextObject::QueryContextMenu and returns.

ShellView Window Procedure

The ShellView window procedure controls the standard processing of the ShellView window. In particular, the ShellView window procedure controls the standard manipulation of items that is provided the file manager. However, the ShellView window procedure needs to notify the ShellBrowser object of changes in the state of the ShellView window and needs to request services of the ShellBrowser. The ShellView window procedure invokes the methods of ICommDlgBrowser interface to communicate with the ShellBrowser object.

The ShellView window procedure notifies the ShellBrowser object when the selection of the items in the ShellView window changes, when an item in the ShellView window is renamed, when the default action for an item in the ShellView window is indicated, and when the state of the focus of the ShellView window changes. The ShellView window procedure invokes the services of the ShellBrowser object to determine which of the items in the folder to display in the ShellView window.

When the ShellView window procedure detects a change in selection of its items, the ShellView window procedure invokes the method ICommDlgBrowser::OnStateChange. As discussed above the method OnStateChange determines which items are selected by invoking the method of the IDataObject interface. The method OnStateChange updates the fields of the Dialog window to reflect the change in the selection.

When the ShellView window procedure detects that an item is renamed, the ShellView window procedure invokes the method ICommDlgBrowser::OnStateChange. The method OnStateChange determines which item is selected and updates the fields of the Dialog window accordingly. For example, if the selected item is currently displayed in the FileName field, the its name in the FileName field is changed to reflect the new name.

When the ShellView window procedure detects that a user has indicated that the default action for a selected item should be performed, the ShellView window procedure invokes the method ICommDlgBrowser::OnDefault. As discussed above, the method OnDefault effectively overrides the behavior provided by the ShellView object.

When the ShellView window procedure receives a change in focus message, the ShellView window procedure invokes the method ICommDlgBrowser::OnStateChange. The method OnStateChange sets the fields and controls of the Dialog window to reflect the change in focus.

When the ShellView window procedure needs to refresh its window, the ShellView window procedure invokes the method ICommDlgBrowser::IncludeObject. The method IncludeObject, as discussed above, determines whether the passed item should be included in the refreshed ShellView window.

Although the present invention has been described in terms of a preferred embodiment, it is not intended that the invention be limited to this embodiment. Modifications within the spirit of the invention will be apparent to those skilled in the art. The scope of the present invention is defined by the claims that follow.

What is claimed is:

1. A method in a computer system for providing a single window in which a user may both modify a filesystem hierarchy of the computer system and select a filesystem object name to use for saving an application document residing in a memory of the computer system as a filesystem object, the method comprising the steps of:

(a) displaying a window containing a visual representation of the filesystem hierarchy;

(b) receiving in connection with the window a command to modify the filesystem hierarchy;

(c) processing the received command to modify the filesystem hierarchy;

(d) redisplaying the visual representation of the filesystem hierarchy in the window to reflect the modification of the filesystem hierarchy;

(e) receiving in connection with the window a command to select a filesystem object name within the filesystem hierarchy; and (f) storing as a filesystem object a representation of the application document residing in the memory, using the selected filesystem object name.

2. The method of claim 1 wherein step (b) includes the step of receiving a command to delete an identified filesystem object of the filesystem hierarchy, and wherein step (c) includes the step of deleting the identified filesystem object.

3. The method of claim 1 wherein step (b) includes the step of receiving a command to rename to a target name an identified filesystem object of the filesystem hierarchy, and wherein step (c) includes the step of renaming the identified filesystem object to the target name.

4. The method of claim 1 wherein step (b) includes the step of receiving a command to move to a target location in the filesystem hierarchy an identified filesystem object of the filesystem hierarchy, and wherein step (c) includes the step of moving the identified filesystem object to the target location.

5. The method of claim 1 wherein step (b) includes the step of receiving a command to create a container object in the filesystem hierarchy at a target location, and wherein step (c) includes the step of creating a container object in the filesystem hierarchy at the target location.

6. The method of claim 5 wherein step (e) includes the step of receiving a command selecting a filesystem object name within the created container object, and wherein step (f) includes the step of saving the application document within the created container object.

7. The method of claim 1 wherein step (b) includes the step of receiving a command to display, for an identified filesystem object, a menu showing a list of substantive commands that are applicable to the identified filesystem object, and wherein step (c) includes the step of displaying a menu showing a list of substantive commands that are applicable to the identified filesystem object.

8. A computer-readable medium whose contents cause a computer system to provide a single window in which the user may both modify a filesystem hierarchy of the computer system and select a filesystem object name to use for saving an application document residing in a memory of the computer system as a filesystem object by performing the steps of:

(a) displaying a window containing an indication of a command to modify the filesystem hierarchy and an indication of a command to select a filesystem object name;

(b) receiving from the user a selection of the command to modify the filesystem hierarchy;

(c) modifying the filesystem hierarchy in accordance with the received selection of the command to modify the filesystem hierarchy;

(d) receiving from the user a selection of the command to select a filesystem object name; and (e) storing as a filesystem object a representation of the application document residing in memory, using the selected filesystem object name.

9. The method of claim 8 wherein step (b) includes the step of receiving a command to delete an identified filesystem object of the filesystem hierarchy, and wherein step (c) includes the step of deleting the identified filesystem object.

10. The method of claim 8 wherein step (b) includes the step of receiving a command to rename to a target name an identified filesystem object of the filesystem hierarchy, and wherein step (c) includes the step of renaming the identified filesystem object to the target name.

11. The method of claim 8 wherein step (b) includes the step of receiving a command to move to a target location in the filesystem hierarchy an identified filesystem object of the filesystem hierarchy, and wherein step (c) includes the step of moving the identified filesystem object to the target location.

12. The method of claim 8 wherein step (b) includes the step of receiving a command to create a container object in the filesystem hierarchy at a target location, and wherein step (c) includes the step of creating a container object in the filesystem hierarchy at the target location.

13. The method of claim 12 wherein step (d) includes the step of receiving a command selecting a filesystem object name within the created container object, and wherein step (e) includes the step of saving the application document within the created container object.

14. The method of claim 8 wherein step (b) includes the step of receiving a command to display, for an identified filesystem object, a menu showing a list of substantive commands that are applicable to the identified filesystem object, and wherein step (c) includes the step of displaying a menu showing a list of substantive commands that are applicable to the identified filesystem object.

15. A method in a computer system having an operating system and a filesystem hierarchy, the filesystem hierarchy organizing filesystem objects having names that identify the filesystem objects within the filesystem hierarchy, the method for performing filesystem hierarchy manipulation and filesystem object name selection services in an application programming interface implemented by the operating system, the method comprising the steps of:

(a) receiving an application programming interface call from an application program; and (b) in response to the received application programming interface call, under the control of the operating system:

(1) receiving directly from a user a command to modify the filesystem hierarchy, (2) processing the received command to modify the filesystem hierarchy, (3) receiving directly from a user a command to select a filesystem object name occurring within the filesystem hierarchy, and (4) returning the selected filesystem object name to the application program.

16. The method of claim 15, further including the step of saving a document using the returned filesystem object name under the control of the application program.

17. The method of claim 15, further including the step of opening a document using the returned filesystem object name under the control of the application program.

18. The method of claim 15, further including the step of printing a document using the returned filesystem object name under the control of the application program.

19. The method of claim 15 wherein step (1) includes the step of receiving a command to delete an identified filesystem object of the filesystem hierarchy, and wherein step (2) includes the step of deleting the identified filesystem object.

20. The method of claim 15 wherein step (1) includes the step of receiving a command to rename to a target name an identified filesystem object of the filesystem hierarchy, and wherein step (2) includes the step of renaming the identified filesystem object to the target name.

21. The method of claim 15 wherein step (1) includes the step of receiving a command to move to a target location in the filesystem hierarchy an identified filesystem object of the filesystem hierarchy, and wherein step (2) includes the step of moving the identified filesystem object to the target location.

22. The method of claim 15 wherein step (1) includes the step of receiving a command to search for a filesystem object of the filesystem hierarchy having specified attributes, and wherein step (2) includes the step of displaying an indication of an object of the filesystem hierarchy having the specified attributes.

23. The method of claim 15 wherein step (1) includes the step of receiving a command to create a container object in the filesystem hierarchy at a target location, and wherein step (2) includes the step of creating a container object in the filesystem hierarchy at the target location.

24. The method of claim 23 wherein the selecting step includes the step of selecting a filesystem object name within the created container object.

25. The method of claim 15 wherein step (1) includes the step of receiving a command to display, for an identified filesystem object, a menu showing a list of substantive commands that are applicable to the identified filesystem object, and wherein step (2) includes the step of displaying a menu showing a list of substantive commands that are applicable to the identified filesystem object.

26. A computer-readable medium whose contents cause a computer system having an operating system and a filesystem hierarchy to perform filesystem hierarchy manipulation and filesystem object name selection services in an application programming interface implemented by the operating system, the filesystem hierarchy organizing filesystem objects having names that identify the filesystem objects within the filesystem hierarchy, by performing the steps of:
 (a) receiving an application programming interface call from an application program; and
 (b) in response to the received application programming interface call from an application program, under the control of the operating system:
  (1) receiving directly from a user a command to modify the filesystem hierarchy,
  (2) processing the received command to modify the filesystem hierarchy,
  (3) receiving directly from a user a command to select a filesystem object name occurring within the filesystem hierarchy, and
  (4) returning the selected filesystem object name to the application program.

27. A computer system that has a filesystem hierarchy organizing filesystem objects having names that identify the filesystem objects within the hierarchy, the computer system performing filesystem hierarchy manipulations and filesystem object name selection services in an application programming interface, comprising:
 a processor for executing application programming interface code; and
 a memory containing code for a single application programming interface that performs filesystem hierarchy manipulation and filesystem object name selection services that is executed on the processor in response to receiving an application program interface call from an application program, to:
  receive a command to modify the filesystem hierarchy,
  process the received command to modify the filesystem hierarchy,
  receive a command to select a filesystem object name occurring with the filesystem hierarchy, and
  return the selected filesystem object name to the application program.

28. A method in a computer system having a filesystem hierarchy for sharing a single programmatic interface for displaying and manipulating the filesystem hierarchy between a file manager program and an application program, the method comprising the steps of:
 (a) executing the file manager program enabling a user to manage filesystem objects occurring in the filesystem hierarchy;
 (b) under the control of the file manager program, directly calling the interface;
 (c) in response to step (b), under the control of the interface, executing code for displaying the filesystem hierarchy and enabling a user to manipulate the filesystem hierarchy;
 (d) executing the application program;
 (e) under the control of the application program, executing code for the application program that is not also code of the file manager program for providing a visual user interface for opening and saving documents to display a visual user interface for opening and saving documents;
 (f) under the control of the code executed by the application program for providing a visual user interface for opening and saving documents, directly calling the interface; and
 (g) in response to (f), under the control of the interface, executing code for displaying the filesystem hierarchy and enabling the user to manipulate the filesystem hierarchy.

29. The method of claim 28 wherein step (g) includes the step of calling back to the code executed by the application program for providing a visual user interface for opening and saving documents to add to the visual user interface visual a control for manipulating the filesystem hierarchy, and wherein the visual interface displayed in step (e) incorporates the added visual control.

30. The method of claim 29 wherein the added visual control is a menu.

31. The method of claim 29 wherein the added visual control is a tool bar button.

32. A computer-readable medium whose contents cause a computer system to share a single programmatic interface for displaying and manipulating a filesystem hierarchy between a file manager program and an application program by performing the steps of:
 executing the file manager program enabling a user to manage filesystem objects occurring in the filesystem hierarchy, wherein the file manager program directly calls the interface and wherein the interface enables a user to manipulate the filesystem hierarchy; and
 executing the application program, wherein the application program provides a visual user interface for opening and saving documents and directly calls the interface, and wherein the interface enables the user to manipulate the filesystem hierarchy.

33. The computer-readable medium of claim 32 wherein the contents of the computer-readable medium further cause the computer system to perform the step of, under the control of the interface, calling back to the application program to add to the visual user interface a visual control for manipulating the filesystem hierarchy, and wherein the visual interface provided by the application program incorporates the added visual control.

34. A computer system that shares a single programmatic interface for displaying and manipulating a filesystem hierarchy between a file manager program and an application program, comprising:
 a processor for executing programs; and
 a memory containing:
  a file manager program executed by the processor to enable a user to manage filesystem objects occurring in the filesystem hierarchy, wherein the file manager program directly calls the interface and wherein the interface enables a user to manipulate the filesystem hierarchy, and
  the application program executed by the processor to provide an application program functionality, wherein the application program provides a visual user interface for opening and saving documents and directly calls the interface, and wherein the interface enables the user to manipulate the filesystem hierarchy.

35. A method in a computer system having a filesystem hierarchy for displaying and enabling a user to modify the filesystem hierarchy under the control of a single programmatic interface on behalf of both a first application program and a second application program, the method comprising the steps of:

(a) executing the first application program;

(b) on behalf of the first application program, directly calling the interface;

(c) in response to step (b), under the control of the interface, executing code for displaying the filesystem hierarchy and enabling the user to manipulate the filesystem hierarchy;

(d) executing the second application program;

(e) on behalf of the second application program, directly calling the interface; and (f) in response to step (e), under the control of the interface, executing code for displaying the filesystem hierarchy and enabling the user to manipulate the filesystem hierarchy.

36. A computer-readable medium whose contents cause a computer system having a filesystem hierarchy to display and enable a user to modify the filesystem hierarchy under the control of a single programmatic interface on behalf of both a first application program and a second application program by performing the steps of:

(a) executing the first application program;

(b) on behalf of the first application program, directly calling the interface;

(c) in response to step (b), under the control of the interface, executing code for displaying the filesystem hierarchy and enabling the user to manipulate the filesystem hierarchy;

(d) executing the second application program;

(e) on behalf of the second application program, directly calling the interface; and (f) in response to step (e), under the control of the interface, executing code for displaying the filesystem hierarchy and enabling the user to manipulate the filesystem hierarchy.

37. A method in a computer system having a filesystem hierarchy for sharing a single programmatic interface for displaying and manipulating the filesystem hierarchy between a file manager program and an application program, the method comprising the steps of:

(a) executing the file manager program enabling a user to manage filesystem objects occurring in the filesystem hierarchy;

(b) under the control of the file manager program, directly calling the interface;

(c) in response to step (b), under the control of the interface, executing code for enabling a user to manipulate the filesystem hierarchy;

(d) executing the application program;

(e) under the control of the application program, executing code for the application program that is not also code of the file manager program for providing a user interface for opening and saving documents;

(f) under the control of the code executed by the application program for providing the user interface for opening and saving documents, directly calling the interface; and (g) in response to (f), under the control of the interface, executing code for displaying the filesystem hierarchy and enabling the user to manipulate the filesystem hierarchy.

* * * * *